F. W. CAMP.
BELT GEARING.
APPLICATION FILED DEC. 26, 1911.
1,031,106. Patented July 2, 1912.
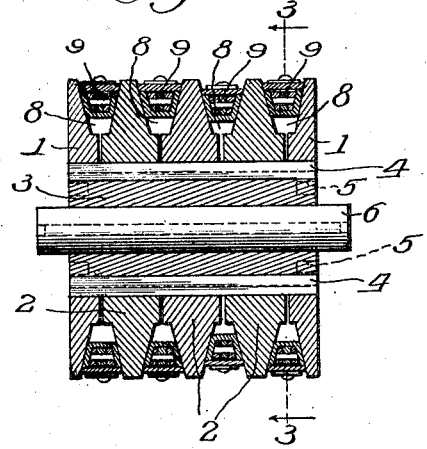
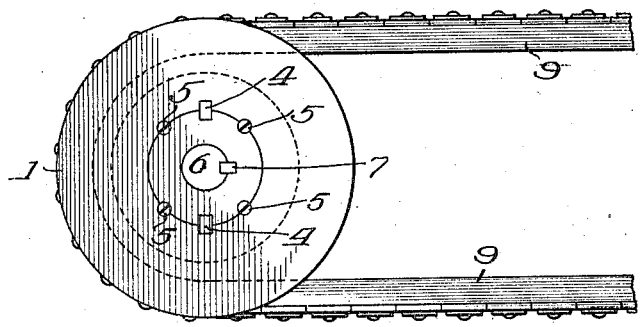
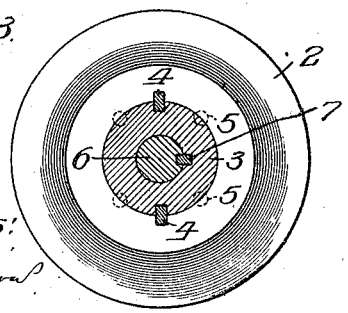 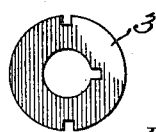
Witnesses:
Inventor:
F. W. Camp.
By Barton & Folk,
Attys.

UNITED STATES PATENT OFFICE.

FORREST WM. CAMP, OF GLENELLYN, ILLINOIS.

BELT-GEARING.

1,031,106. Specification of Letters Patent. Patented July 2, 1912.

Application filed December 26, 1911. Serial No. 667,870.

*To all whom it may concern:*

Be it known that I, FORREST W. CAMP, citizen of the United States, residing at Glenellyn, in the county of Dupage and State of Illinois, have invented a certain new and useful Improvement in Belt-Gearing, of which the following is a full, clear, concise, and exact description.

My invention relates to belt gearing of the type in which the pulley is provided with a plurality of peripheral grooves for receiving independent strands of a chain, cable, belt or the like in lieu of a single broad belt. Its object is to provide a belt gearing of this type in which each strand is subjected to an equal strain at all times.

My invention contemplates a belt gearing comprising a pulley having a plurality of peripheral grooves which are automatically adjustable to equalize the strain upon the belt having several strands which work in said grooves.

The several features of my invention may be more readily understood by reference to the accompanying drawings, which show the preferred embodiment of the invention, in which—

Figure 1 is a longitudinal, central section through the pulley; Fig. 2 is an end elevation of the pulley; Fig. 3 is a section on the line 3—3 of Fig. 1; and Fig. 4 is an end view of the hub of the pulley.

Similar letters of reference refer to similar parts throughout the several views.

The pulley is composed of a plurality of pulley-sections, there being two end sections 1, 1 and intermediate sections 2. The several pulley sections are designed to rotate together but are so mounted as to be relatively adjustable toward or away from each other. With this end in view the end sections 1, 1 are fixedly secured to the hub 3 preferably by screws 5. The intermediate pulley-sections 2 are held against rotation with respect to the hub 3 by removable keys 4, whereby said intermediate pulley-sections rotate with the hub and end sections. However, said intermediate sections 2 are free to slide longitudinally of the hub between the end sections 1. The keys 4 are removable in order that they may, when worn, be replaced. The hub 3 may be preferably keyed to the shaft 6 by a key 7. The several pulley-sections are preferably tapered toward their peripheries, that is said peripheries are wedge-shaped in cross-section, thereby providing between the several pulley-sections peripheral grooves 8 in which are received the several independent strands 9, which go to make up the compound belt. While the strands are shown as comprising chains of wedge-shape cross-section to conform to the grooves of the pulley, it will be understood that my invention is not limited in its use to any particular type of cable, chain or belt.

Where the driving belt consists of a plurality of independent strands, it has been found that these strands are liable to wear or stretch unequally, thereby becoming loose in the grooves. In such case, in pulleys heretofore commonly used, an undue strain is thrown upon the remaining strands, thus causing the strands to break or to rapidly wear. Moreover if, in such structures, a defective or loose strand is replaced by a new one, such new strand may not have a proportionate strain brought upon it, thus again producing unequal wear. By my invention the grooves 8 of the pulley are automatically adjustable in width or size so as to bring an equal strain upon each of the strands. Such adjustment of the size of the grooves is effected by the relative movement toward or from each other of the several pulley-sections. This adjustment of the size of the grooves to provide equal strain upon all the strands is shown in Fig. 1, wherein the several pulley sections are shown so adjusted as to cause the several chains to ride in the grooves in such relation to the grooves that an equal strain is brought upon the several chains. It thus follows that if one chain becomes more loose upon the pulley than the others, the two pulley sections between which said groove is located will be automatically adjusted toward each other, thereby lessening the width of the pulley groove and thus automatically tightening such loose chain about the pulley. In this way an equal tension is brought upon the several independent chains or strands.

It will be understood that my invention is adapted for use not only where a plurality of independent strands are substituted for a single broad belt, but also to any use in which a plurality of cables, chains, belts or the like are placed over a single pulley, such, for example, as is the case in hoisting devices; and the term "compound belt" as used in the claims is intended to be generic and to include all such plurality of cables, chains, belts or the like.

While I have shown the preferred embodiment of my invention it will be understood that my invention is not limited to the particular structure shown and described.

What I claim is:—

1. The combination with a compound belt composed of independent strands, of a pulley having a plurality of peripheral grooves for receiving said strands, said grooves being automatically adjustable in size to equalize the strain upon said strands.

2. The combination with a compound belt composed of independent strands, of a pulley comprising a hub and a plurality of pulley-sections mounted on said hub and secured against rotation thereon but freely adjustable relatively toward and from each other, said pulley being provided with peripheral grooves located between the adjacent pulley-sections for receiving the independent strands of said belt, whereby said grooves are automatically adjustable in size to equalize the strain upon said strands.

3. The combination with a compound belt composed of independent strands, of a pulley comprising a hub, end pulley-sections fixedly secured to said hub, and intermediate pulley-sections secured against rotation about said hub but free to slide longitudinally thereof, said pulley being provided with peripheral grooves located between the adjacent pulley sections for receiving the independent strands of said belt, whereby said intermediate pulley-sections are automatically adjustable to equalize the strain upon said strands.

4. In a belt gearing device, the combination with a compound belt composed of independent strands of a pulley comprising a hub and pulley-sections mounted on said hub and secured against rotation on said hub but freely adjustable relatively toward and from each other, the peripheries of said pulley-sections being wedge-shaped in cross section to provide V-shaped peripheral grooves between the adjacent pulley-sections for receiving independent strands, whereby the width of the grooves is automatically adjustable to equalize the strain upon said strands.

In witness whereof, I hereunto subscribe my name this twenty-second day of December, A. D., 1911.

FORREST WM. CAMP.

Witnesses:
ALFRED H. MOORE,
MCCLELLAND YOUNG.